(12) United States Patent
Kumar

(10) Patent No.: US 9,600,062 B2
(45) Date of Patent: Mar. 21, 2017

(54) SINGLE CAPACITOR MULTI-PHASE THREE-LEVEL BUCK VOLTAGE REGULATOR

(71) Applicant: Intel Corporation, Santa Clara, CA (US)

(72) Inventor: Pavan M. Kumar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/682,840

(22) Filed: Apr. 9, 2015

(65) Prior Publication Data

US 2016/0299554 A1    Oct. 13, 2016

(51) Int. Cl.
| | | |
|---|---|---|
| *G06F 1/26* | (2006.01) | |
| *G06F 1/32* | (2006.01) | |
| *G06F 3/044* | (2006.01) | |
| *H02M 3/156* | (2006.01) | |
| *H02M 3/158* | (2006.01) | |
| *H02J 7/34* | (2006.01) | |
| *H02M 3/07* | (2006.01) | |

(52) U.S. Cl.
CPC .......... *G06F 1/3287* (2013.01); *G06F 1/3296* (2013.01); *G06F 1/26* (2013.01); *G06F 1/266* (2013.01); *G06F 1/32* (2013.01); *G06F 3/044* (2013.01); *H02J 7/345* (2013.01); *H02M 3/07* (2013.01); *H02M 3/156* (2013.01); *H02M 2003/1586* (2013.01)

(58) Field of Classification Search
CPC ... G06F 1/26; G06F 1/266; G06F 1/32; G06F 3/044; H02M 3/07; H02M 3/156; H02M 2003/1586; H02J 7/345
USPC .......................................... 713/300, 320, 323
See application file for complete search history.

(56) References Cited

U.S. PATENT DOCUMENTS

| | | | |
|---|---|---|---|
| 2008/0082839 A1* | 4/2008 | Dibene | G06F 1/26 713/300 |
| 2016/0124541 A1* | 5/2016 | Cheong | G06F 3/044 345/174 |
| 2016/0190921 A1* | 6/2016 | Kumar | H02M 3/158 323/271 |

\* cited by examiner

*Primary Examiner* — Michael J Brown
(74) *Attorney, Agent, or Firm* — Alpine Technology Law Group LLC

(57) ABSTRACT

Methods and apparatus relating to a single capacitor multi-phase three-level buck Voltage Regulator (VR) are described. In an embodiment, voltage regulator logic includes a first phase portion and a second phase portion. The voltage regulator logic also includes a single capacitor coupled between switches of the first phase portion and the second phase portion. Other embodiments are also disclosed and claimed.

20 Claims, 16 Drawing Sheets

SINGLE CAPACITOR MULTI-PHASE THREE-LEVEL BUCK VOLTAGE REGULATOR

This invention was made with Government support under contract number FA8650-13-3-7338 awarded by the Department of Defense. The Government has certain rights in this invention.

FIELD

The present disclosure generally relates to the field of electronics. More particularly, some embodiments relate to a single capacitor multi-phase three-level buck Voltage Regulator (VR).

BACKGROUND

Voltage Regulators (VRs) are generally used in power delivery applications in which an input voltage needs to be transformed to an output voltage in a ratio that can be smaller or larger than unity. Multi-phase Voltage Regulator (VR) topologies can be used to reduce output voltage ripple and improve the transient response of the power delivery system. In general, the number of passive reactive components needed to implement multiple phases increases linearly with the number of phases (e.g., an n phase implementation requiring n reactive elements). However, additional components may increase the overall cost, power consumption, signal transmission delay, and/or signal loss in a system.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 2A-5, 7, 9, 11, and 13A-14 illustrate various circuit diagrams of voltage regulators, according to some embodiments.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some embodiments provide a single capacitor multi-phase three-level buck Voltage Regulator (VR). As discussed herein, a "buck" VR is generally used in power delivery applications in which an input voltage needs to be transformed to an output voltage in a ratio that is smaller than unity. In an embodiment, a dual phase (e.g., that may be extendable to multi-phase) three-Level buck VR topology is provided that uses a single capacitive element. In general, the proposed topology uses (n+1; n>1) reactive elements to implement n number of phases. For example, a single discrete capacitor on package can be used to implement a two-phase three-level VR solution with on-die (or on-package) inductors.

Moreover, even though at least one embodiment is implemented as a three-level buck VR, the circuit can also be operated as a multi-phase buck VR in certain conditions. In other words, the presence of a (e.g., fly) capacitor does not preclude the multi-phase buck operation; thus, providing an additional circuit knob/control to maximize performance where necessary. Also, some embodiments provide a topology which can be used to obtain very good performance over a wide range of converter (also referred to herein interchangeably as "VR" or "Voltage Regulator") parameters when implemented in a modular fashion with reduced number of reactive elements. Such a topology can also be customized to provide optimal performance if particular load characteristics are known or set. In conjunction with multiple control techniques (such as one or more of linear PWM (Pulse Width Modulation) mode, hysteresis, variable frequency mode, etc.), a very wide range of circuit techniques can be taken advantage of to reduce losses in the system.

Figure 1:
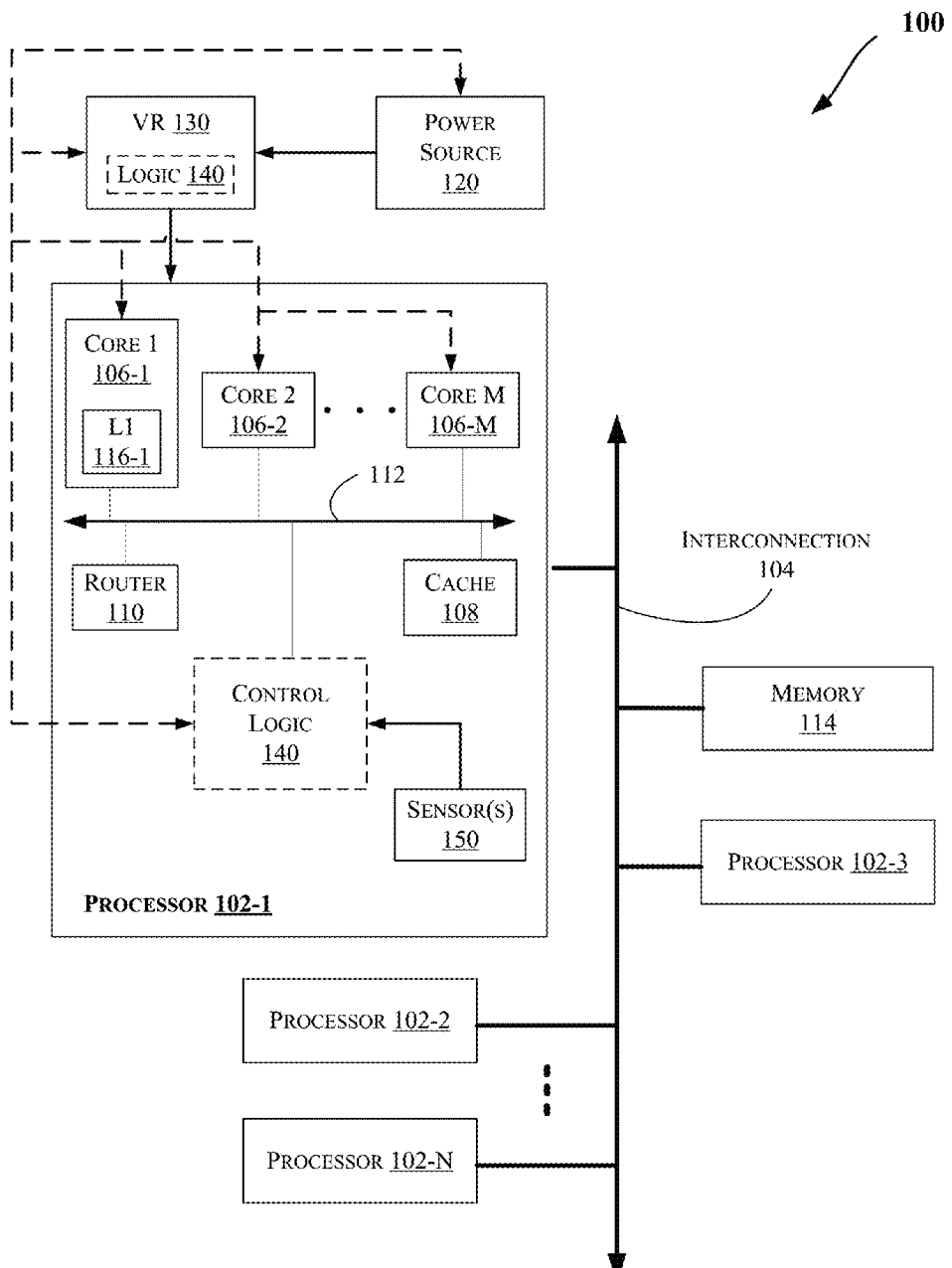
FIGS. 1 and 15-17 illustrate block diagrams of embodiments of computing systems, which may be utilized to implement various embodiments discussed herein.

Furthermore, some embodiments may be applied in computing systems that include one or more processors (e.g., with one or more processor cores), such as those discussed with reference to FIGS. 1-17, including for example mobile computing devices (and/or platforms) such as a smartphone, tablet, UMPC (Ultra-Mobile Personal Computer), laptop computer, Ultrabook™ computing device, smart watch, smart glasses, wearable devices, etc., and/or larger systems such as computer servers with many cores, etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 15-17), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a platform power source 120 (e.g., a Direct Current (DC) power source or an Alternating Current (AC) power source) to provide power to one or more components of the system 100. The power source 120 could include a PV (Photo Voltaic) panel, wind generator, thermal generator water/hydro turbine, etc. In some embodiments, the power source 120 may include one or more battery packs (e.g., charged by one or more of a PV panel, wind generator, thermal generator water/hydro turbine, plug-in power supply (for example, coupled to an AC power grid), etc.) and/or plug-in power supplies. The power source 120 may be coupled to components of system 100 through a Voltage Regulator (VR) 130. Moreover, even though FIG. 1 illustrates one power source 120 and a single voltage regulator 130, additional power sources and/or voltage regulators may be utilized. For example, one or more of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores).

Additionally, while FIG. 1 illustrates the power source 120 and the voltage regulator 130 as separate components, the power source 120 and the voltage regulator 130 may be incorporated into other components of system 100. For example, all or portions of the VR 130 may be incorporated into the power source 120 and/or processor 102.

As shown in FIG. 1, the processor 102 may further include a power control logic 140 (which may be implemented as a Power Management Unit (PMU) for example) to control supply of power to components of the processor 102 (e.g., cores 106). In an embodiment, logic 140 is provided on a reconfigurable power management IC (RPMIC). Such RPMIC implementation(s) may be used in low power devices (such as portable devices discussed herein) through large computer servers such as discussed herein with reference to FIG. 1 or 15-17.

Further, logic 140 may have access to one or more storage devices discussed herein (such as cache 108, L1 cache 116, memory 114, or another memory in system 100) to store information relating to operations of logic 140 such as information communicated with various components of system 100 as discussed here. As shown, the logic 140 may be coupled to the VR 130 and/or other components of system 100 such as the cores 106 and/or the power source 120. Also, logic 140 may be provide elsewhere in system 100, such as within the VR 130.

Additionally, the logic 140 may be coupled to receive information (e.g., in the form of one or more bits or signals) to indicate status of one or more sensors 150. The sensor(s) 150 may be provided proximate to components of system 100 (or other computing systems discussed herein such as those discussed with reference to other figures including 15-17, for example), such as the cores 106, interconnections 104 or 112, components outside of the processor 102, etc., to sense variations in various factors affecting power/thermal behavior of the system/platform, such as temperature, operating frequency, operating voltage, power consumption, and/or inter-core communication activity, etc.

The logic 140 may in turn instruct the VR 130, power source 120, and/or individual components of system 100 (such as the cores 106) to modify their operations. For example, logic 140 may indicate to the VR 130 and/or power source 120 (or PSU (Power Supply Unit)) to adjust their output. Also, logic 140 may include a non-linear logic block in the VR 130 in parallel with the linear block of the VR 130 for generation of PWM signal(s). In some embodiments, logic 140 may request the cores 106 to modify their operating frequency, power consumption, etc. Additionally, even though components 140 and 150 are shown to be included in processor 102-1, these components may be provided elsewhere in the system 100. For example, power control logic 140 may be provided in the VR 130, in the power source 120, directly coupled to the interconnection 104, within one or more (or alternatively all) of the processors 102, outside of computing device/system (e.g., as a stand-alone device), coupled to (or integrated with) the power source 120, etc.

Figures 2A, 2B:
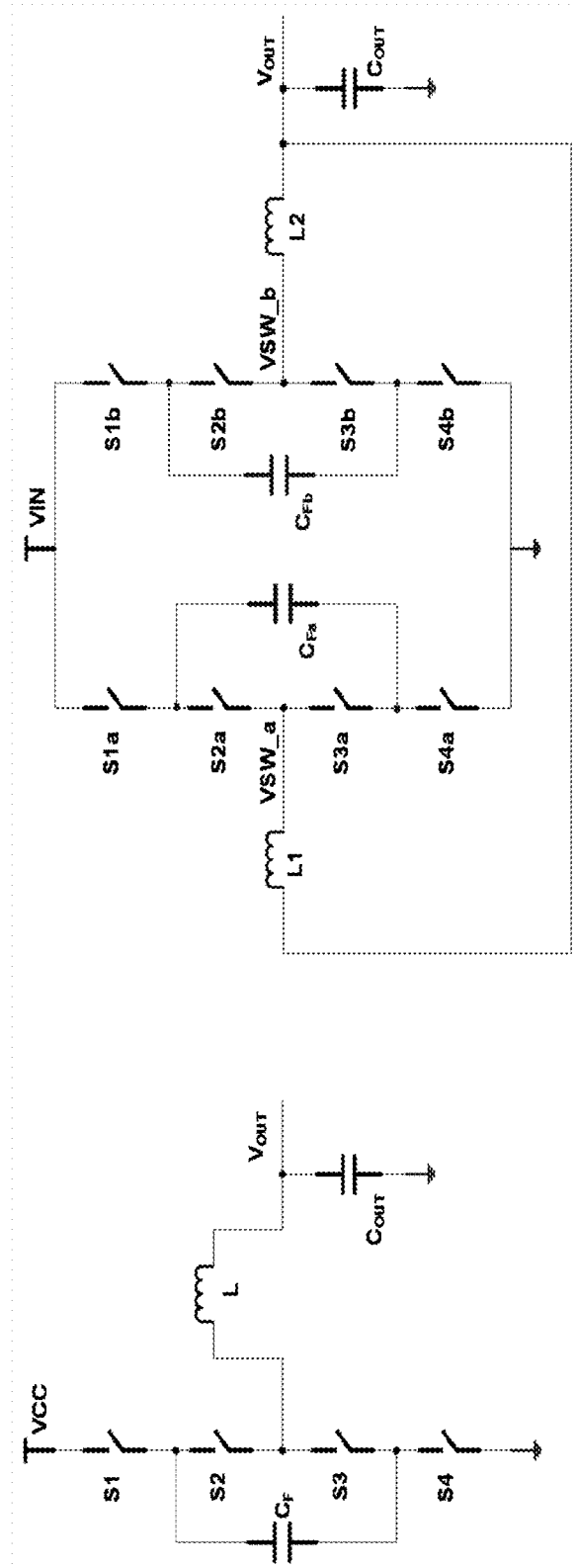
Figure 14:
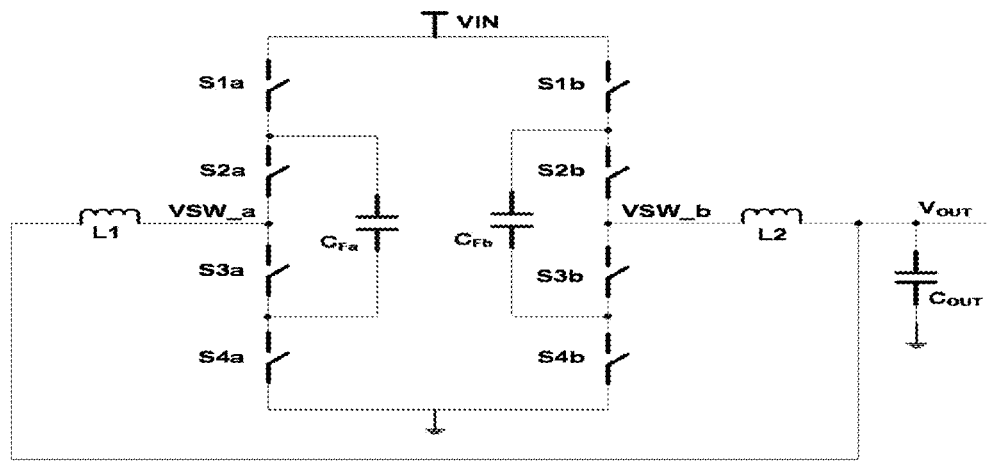

FIG. 2A illustrates a three-level buck VR with better efficiency, ripple, and transient characteristics in certain applications compared to a conventional buck VR topology although it uses two reactive elements (a flying capacitor $C_F$ and the filter inductor L). Extending the three-level topology to multi-phases requires "2n" number of reactive elements per phase driving the cost and the implementation complexity higher (e.g., such as shown in FIG. 2B & FIG. 14). This is especially true in such VR applications where combinations of discrete and on-die reactive elements are sometimes used on packages and silicon to maximize performance. The reduction of passive elements helps in designing optimal power delivery systems with the least number of reactive elements.

Figure 3:
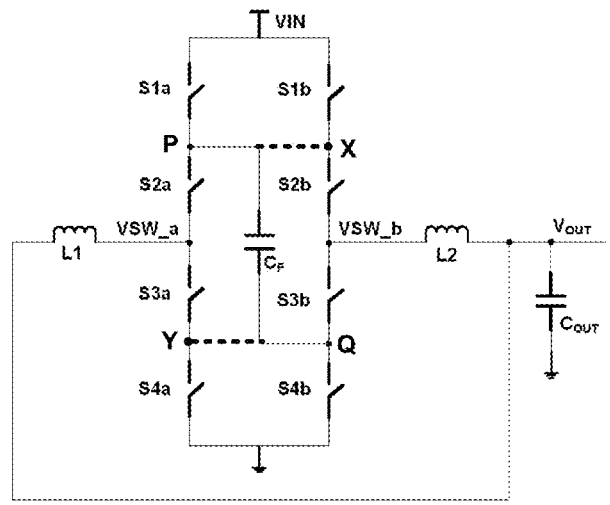

FIG. 3 illustrates a circuit diagram of a single capacitor multi-phase three-level buck VR, according to an embodiment. In an embodiment, the circuit diagram of FIG. 3 may be implemented in the VR 130 discussed herein, e.g., with reference to FIGS. 1-17. Further, to provide a more clear view (and avoid obscuring the particular embodiment), the driver circuits and control features are not shown in FIG. 3. The two phase portions are implemented with switches S1 to S4 (suffixed with 'a' and 'b' for each phase). In an embodiment, the switches could be bipolar junction transistors (BJTs), field effect transistors (FETs), insulated gate bipolar junction transistors (IGBTs), relays and/or some device which can take two distinct states ON and OFF. The single fly capacitor $C_F$ is coupled between the two phases (as opposed to the conventional circuit shown in FIG. 2B and FIG. 14) at P & Q. The inductors L1 and L2 along with the output capacitor COUT form the phase shifted filter network that is used to reduce output ripple and provide a DC (Direct Current) voltage. It is noted that the proposed topology can also be achieved by coupling the single fly capacitor $C_F$ between the two phases at the points X & Y instead of a P & Q. Those with ordinary skill in the art would recognize the equivalency of the embodiment with the fly capacitor coupling being either between P & Q or between X & Y. The proposed topology can be extended to a higher number of phases either by coupling additional switching legs and inductors to the same capacitor or by repeating the dual phase unit with the outputs coupled at $V_{OUT}$. The former case results in a single capacitor for a large number of phases (for this the size of the fly capacitor needs to be increased to support the energy draw), while the latter case may use one additional capacitor for each additional dual phase unit.

Also, as shown in FIG. 3 and discussed herein, in an embodiment, a single capacitor may be present with dual (or multiple) inductors. Discrete capacitor(s) on the package may be used with multiple package (or on-die) inductors in some embodiments. Equivalently a single on-die capacitor may be used with multiple on-die (or on package) inductors in some embodiments.

Figure 4:
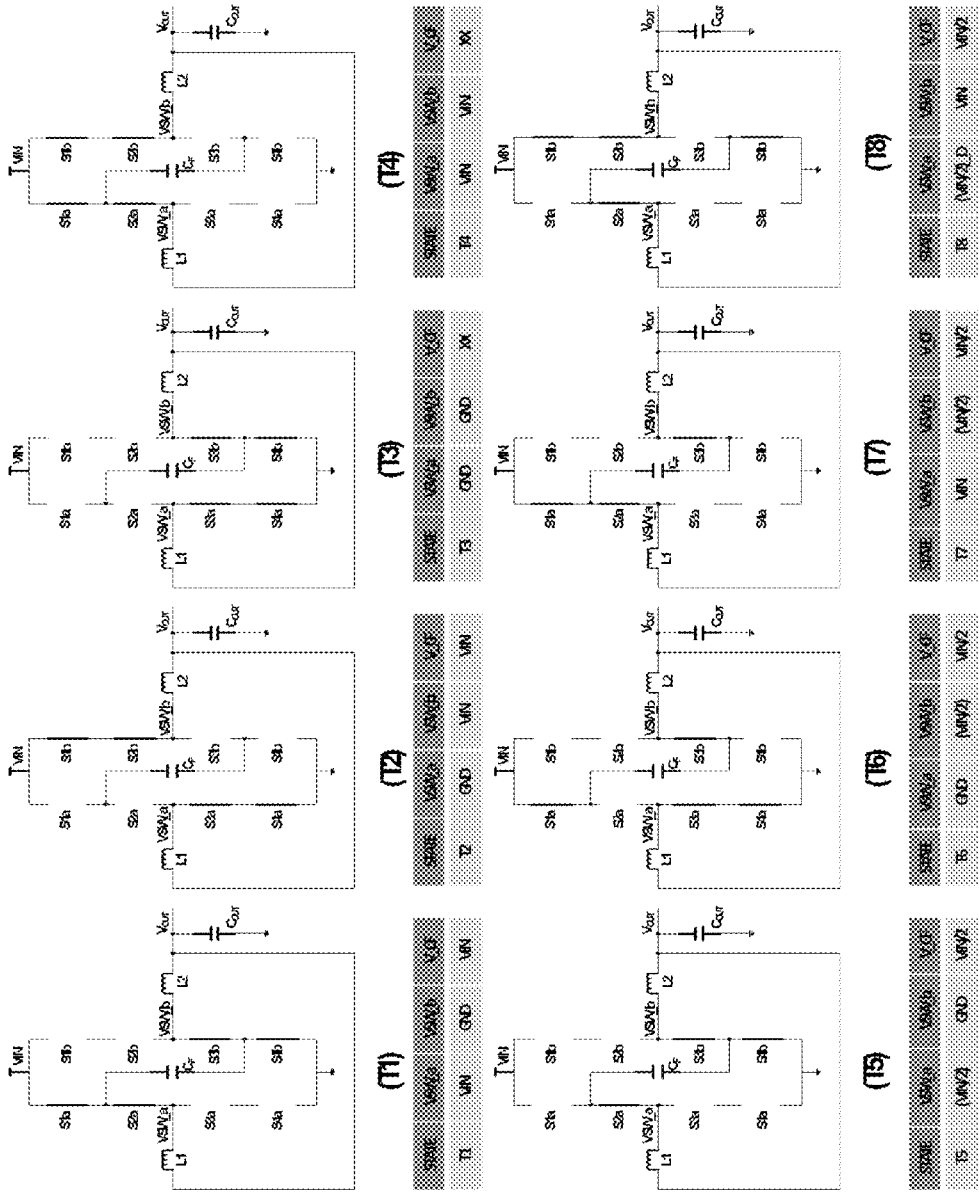

FIG. 4 shows the resulting eight unique circuit states of the VR of FIG. 3 (labeled as T1 to T8), according to some embodiments. An appropriate choice of the circuit states can be used to generate the required voltages that are 180 degrees out of phases at the switch nodes VSW_a and VSW_b, respectively. The fly capacitor $C_F$ will not be in the picture under certain states when the topology is used in the conventional (interchangeably used as traditional) buck converter mode. In such cases, the fly capacitor may either be charged to the full supply voltage (VIN) or half the supply voltage (VIN/2).

According to an embodiment, the presence of the fly capacitor in such cases is incidental and does not hinder the operation of the converter. It is to be noted that the semiconductor switches (Sx) may receive different voltage stress levels depending on the mode of operation of the converter. The converter can also be operated as a single phase buck converter by operating only one of the legs of the proposed topology—which is similar to some current methods for dropping phases based on load levels to maximize efficiency of the converter.

Figure 5:
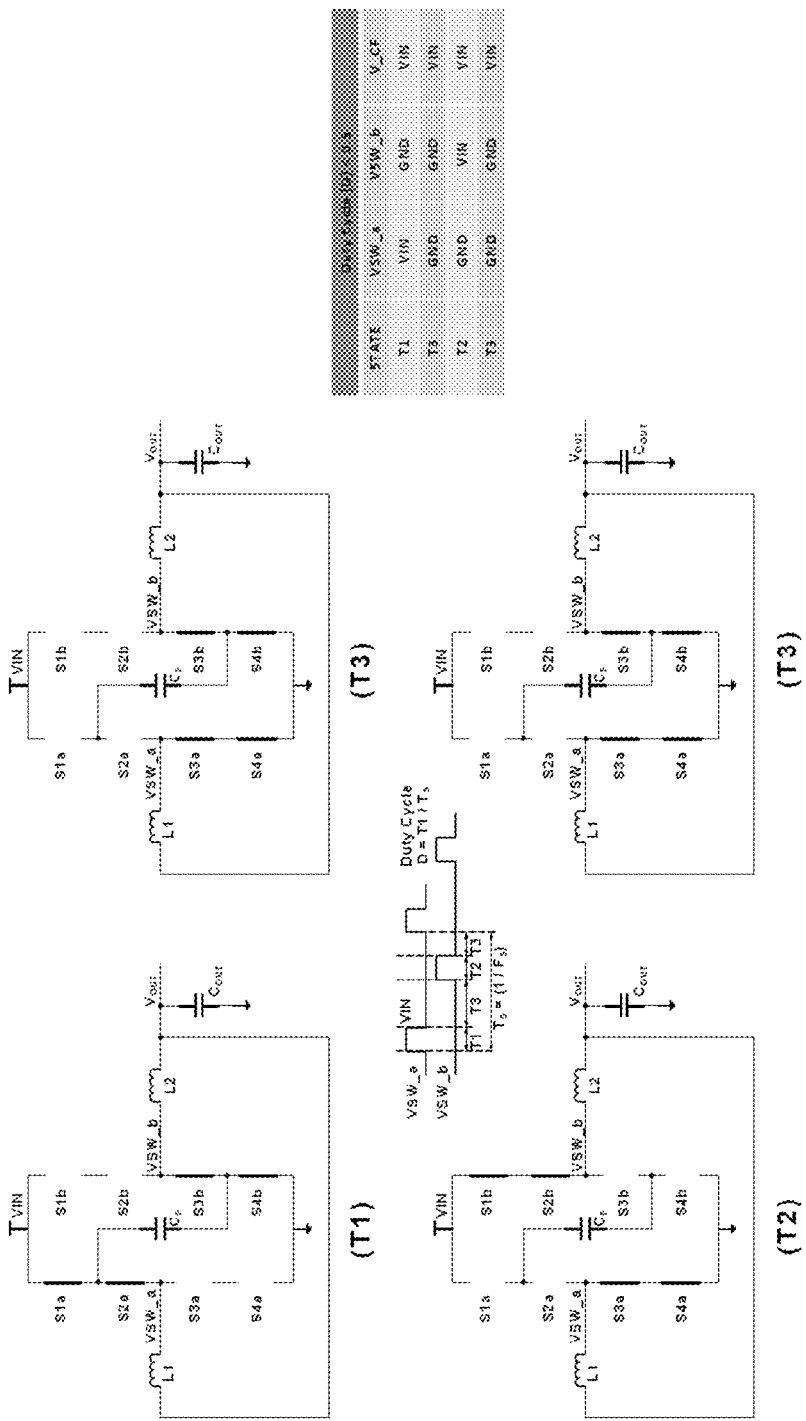
Figure 6:
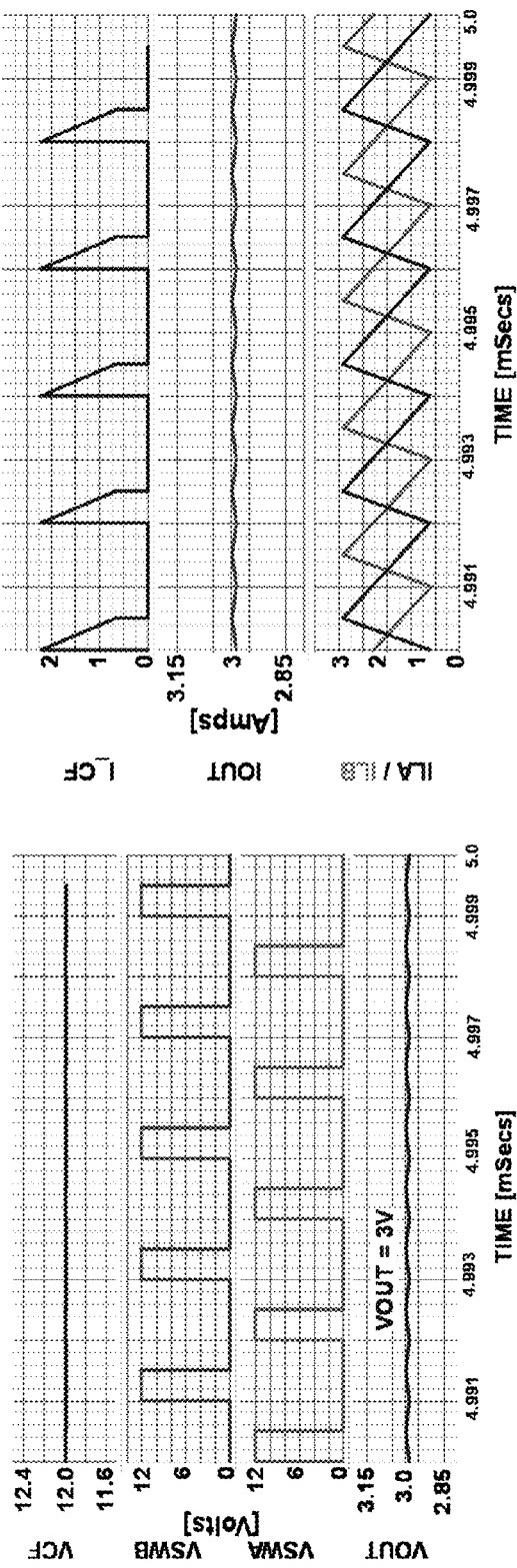
FIGS. 6, 8, 10, and 12 illustrate sample simulation graphs according to some embodiments.

FIGS. 5 and 6 show the circuit states and the simulation results of the proposed topology, respectively, being operated as a conventional multi-phase buck VR with duty cycle less than 50%, according to some embodiments. The fly capacitor is incidental to the operation and is not required. It will always be charged to the full voltage (VIN) during this mode of operation. Accordingly, an embodiment of the VR can be selectively implemented with a combination of conventional buck converters in a multi-phase fashion. In other words, some phases of a multi-phase buck VR may contain the proposed fly capacitor configuration while others do not. Such a configuration provides flexibility to operate the converter in multiple modes to maximize efficiency and/or transient response at a reduced cost (and number of passive reactive elements).

Figure 7:
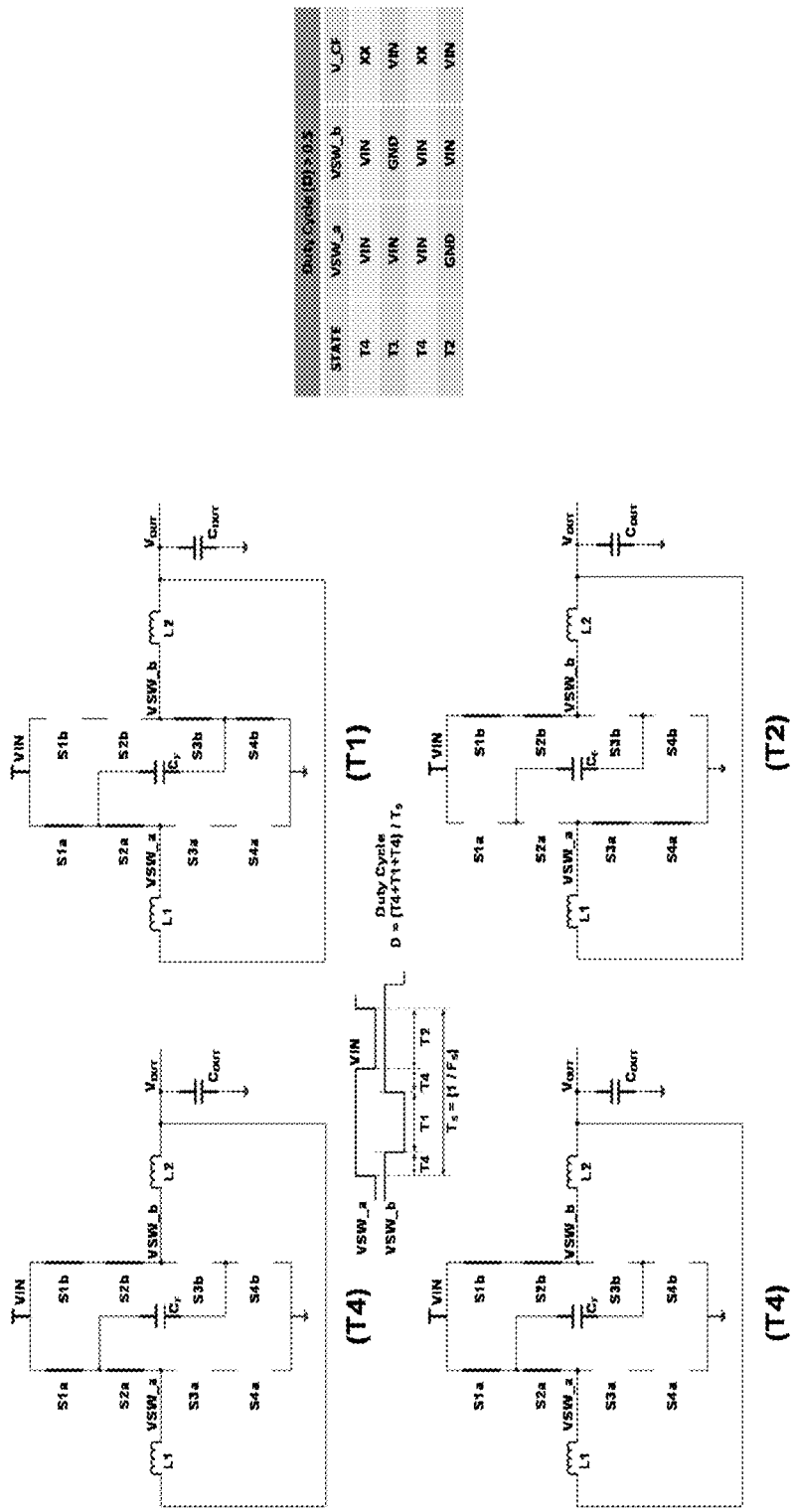
Figure 8:
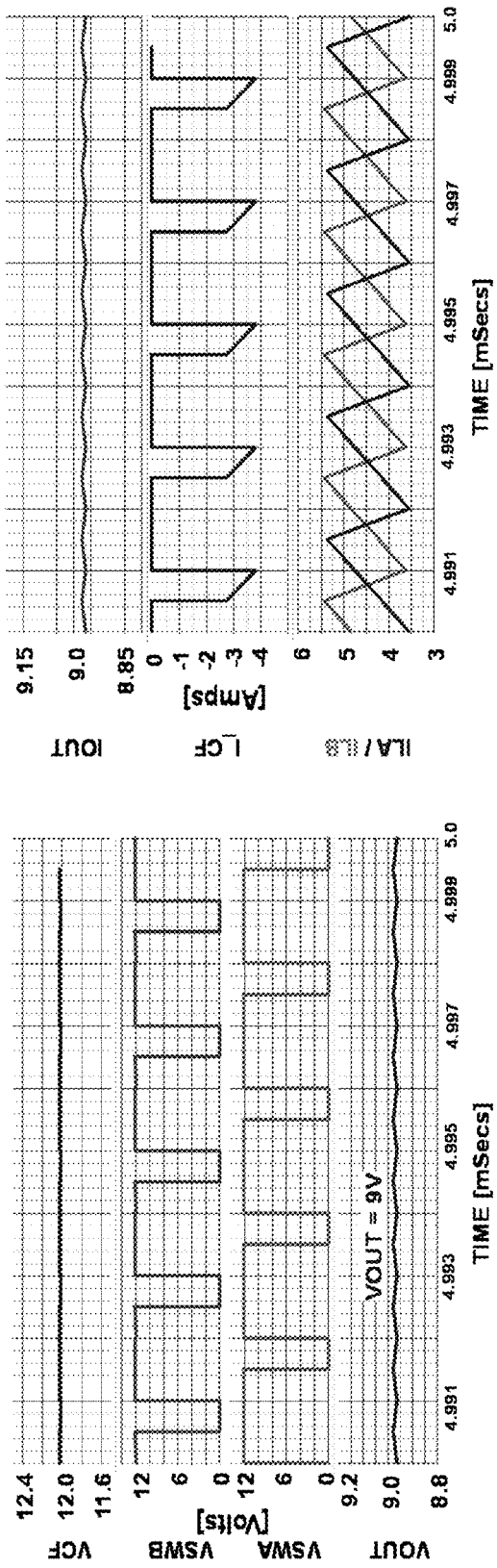

FIGS. 7 and 8 show the circuit states and the simulation results, respectively, of the proposed topology being operated as a conventional multi-phase buck VR with duty cycle greater than 50%, according to some embodiments. The fly capacitor is again incidental to the operation and is not required in an embodiment.

Figure 9:
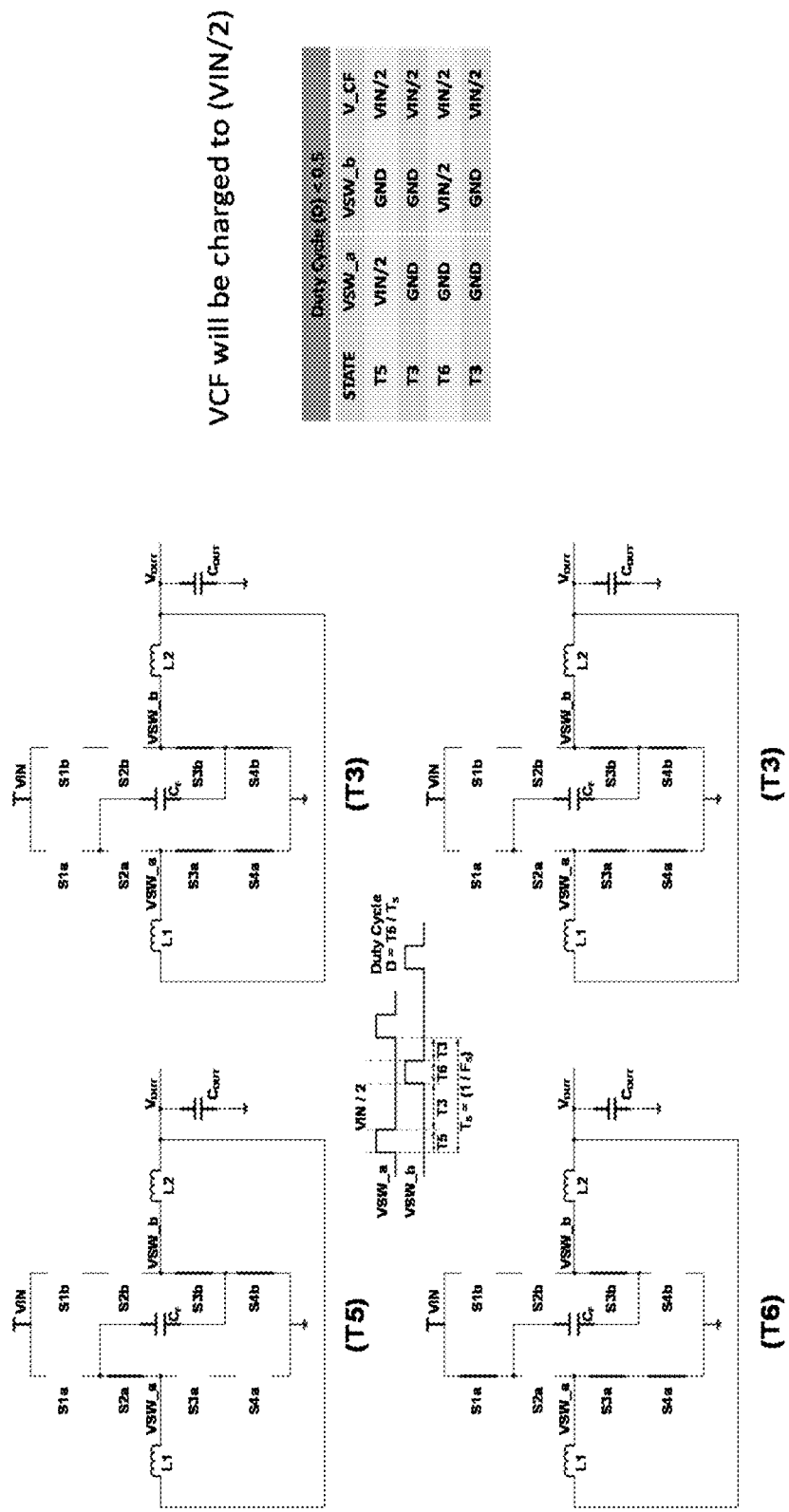
Figure 10:
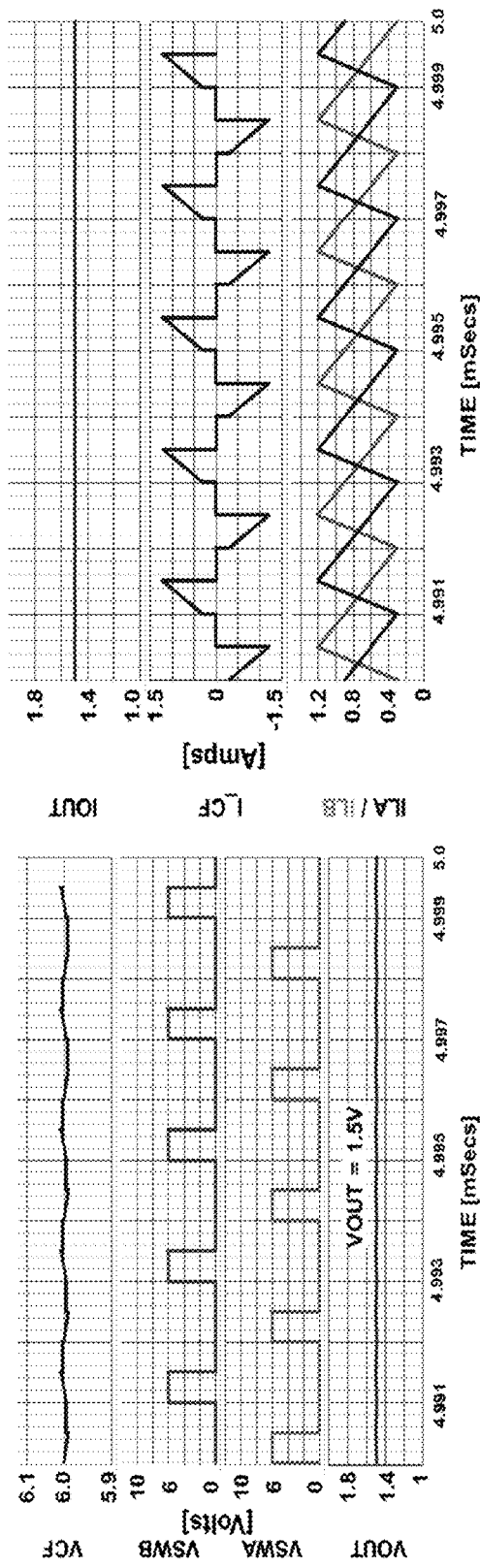
Figure 11:
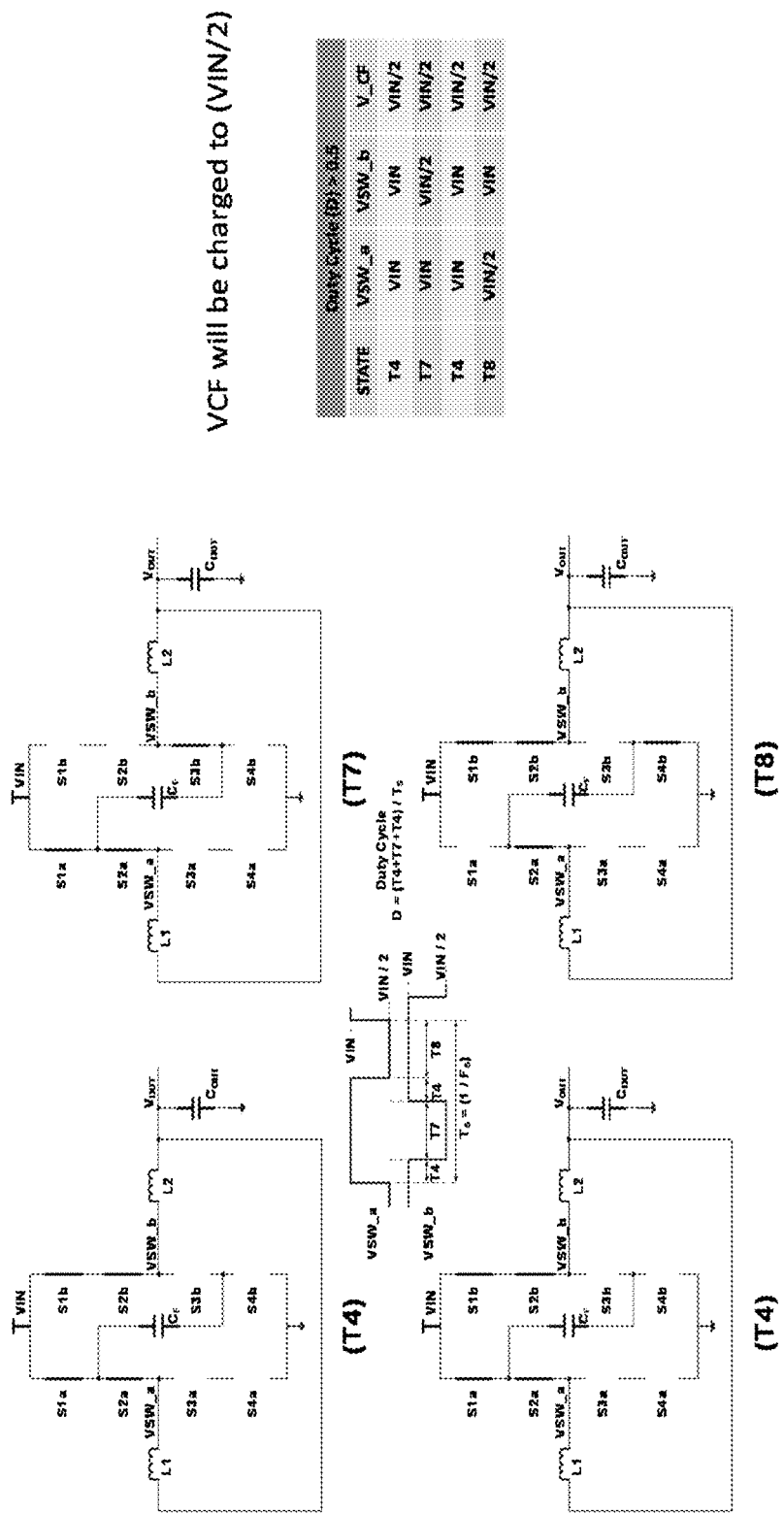
Figure 12:
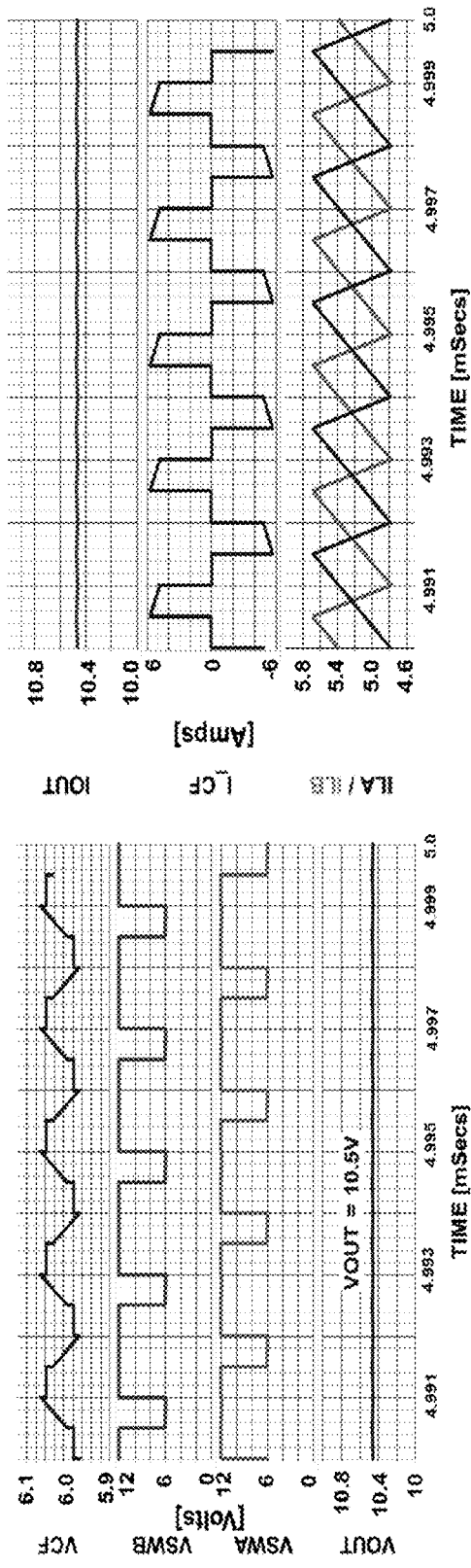

FIG. 9 shows the operation of the proposed topology as a multi-phase three-level buck VR with a duty cycle of less than 50%, with its simulation results shown in FIG. 10, according to some embodiments. In this mode, the fly capacitor is charged to one half of the supply voltage (VIN/2) and is necessary for proper operation. Switch nodes VSW_a and VSW_b see one half the supply voltage as expected for a three-level buck VR. Similarly, FIGS. 11 and 12 shows the multi-phase three-level operation of the buck VR with duty cycle greater than 50%, according to some embodiments. The fly capacitor is again charged to (VIN/2) and is essential for proper circuit operation.

Figure 13A:
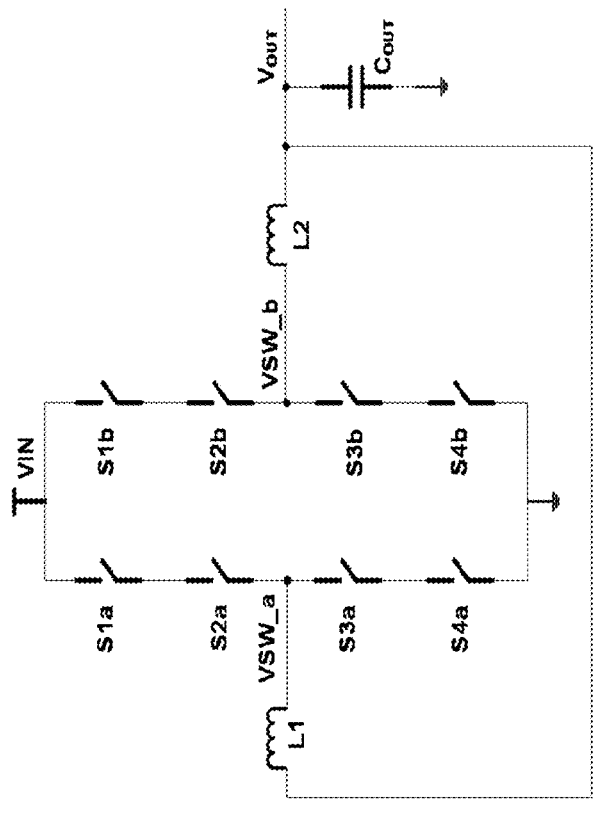
Figure 13B:
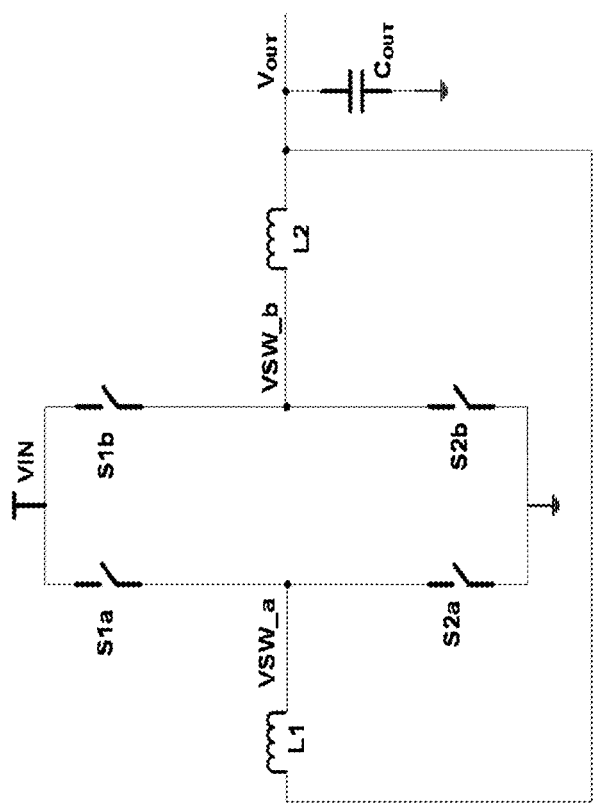

For the sake of comparison and ease of reference, FIGS. 13A and 13B illustrate circuit diagrams for a conventional multi-phase buck VR and a typical on-die implementation, respectively. Also, FIG. 14 illustrates a circuit diagram of a conventional three-level buck VR topology.

By contrast, embodiments discussed herein provide various improvements including one or more of: (1) a reduced number of reactive element for multi-phase VR applications; (2) a single capacitor (either on-die MIM cap or a discrete capacitor on the package) that can be used to implement a dual phase three-level VR (e.g., a discrete capacitor on package can provide a relatively large storage and a stable source for multiple phases, and efficiency of the VR can be improved due to a large fly capacitor implemented on the package); (3) reduced cost (or silicon area) due to reduction in the number of capacitors used; and (4) same circuit topology can be used both as a regular buck VR and as a three-level buck VR, or a combination of the two for optimal performance.

Figure 15:
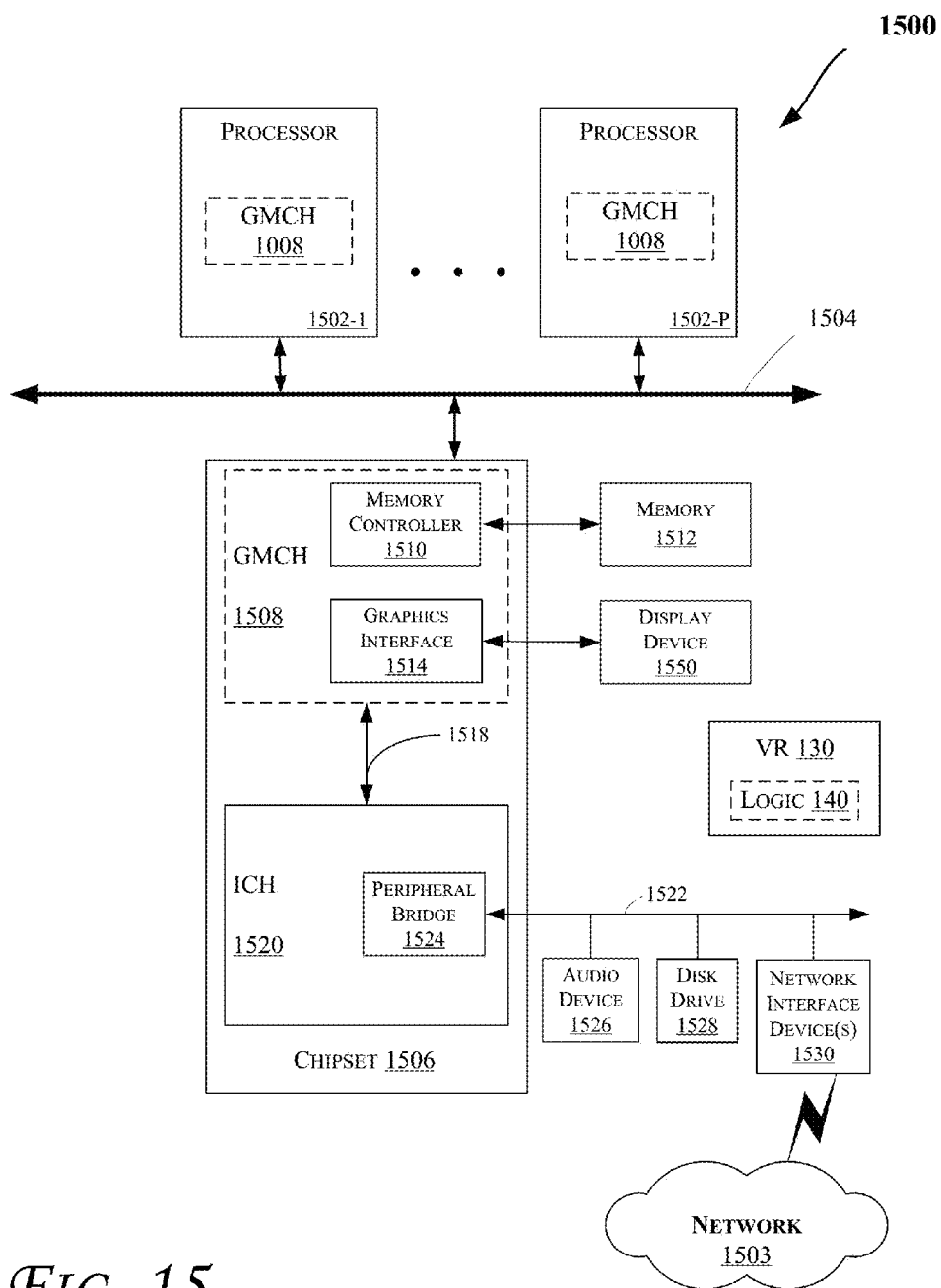

FIG. 15 illustrates a block diagram of a computing system 1500 in accordance with an embodiment. The computing system 1500 may include one or more central processing unit(s) (CPUs) or processors 1502-1 through 1502-P (which may be referred to herein as "processors 1502" or "processor 1502"). The processors 1502 may communicate via an interconnection network (or bus) 1504. The processors 1502 may include a general purpose processor, a network processor (that processes data communicated over a computer network 1503), or other types of a processor (including a reduced instruction set computer (RISC) processor or a complex instruction set computer (CISC)). Moreover, the processors 1502 may have a single or multiple core design. The processors 1502 with a multiple core design may integrate different types of processor cores on the same integrated circuit (IC) die. Also, the processors 1502 with a multiple core design may be implemented as symmetrical or asymmetrical multiprocessors. In an embodiment, one or more of the processors 1502 may be the same or similar to the processors 102 of FIG. 1. In some embodiments, one or more of the processors 1502 may include one or more of the cores 106, logic 140, and sensor(s) 150, of FIG. 1. Also, the operations discussed with reference to FIGS. 1-14 may be performed by one or more components of the system 1500. For example, a voltage regulator (such as VR 130 of FIG. 1) may regulate voltage supplied to one or more components of FIG. 15 at the direction of logic 140.

A chipset 1506 may also communicate with the interconnection network 1504. The chipset 1506 may include a graphics and memory control hub (GMCH) 1508. The GMCH 1508 may include a memory controller 1510 that communicates with a memory 1512. The memory 1512 may store data, including sequences of instructions that are executed by the processor 1502, or any other device included in the computing system 1500. In one embodiment, the memory 1512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 1504, such as multiple CPUs and/or multiple system memories.

The GMCH 1508 may also include a graphics interface 1514 that communicates with a display device 1550, e.g., a graphics accelerator. In one embodiment, the graphics interface 1514 may communicate with the display device 1550 via an accelerated graphics port (AGP) or Peripheral Component Interconnect (PCI) (or PCI express (PCIe) interface). In an embodiment, the display device 1550 (such as a flat panel display (such as an LCD (Liquid Crystal Display), a cathode ray tube (CRT), a projection screen, etc.) may communicate with the graphics interface 1514 through, for example, a signal converter that translates a digital representation of an image stored in a storage device such as video memory or system memory into display signals that are interpreted and displayed by the display. The display signals produced may pass through various control devices before being interpreted by and subsequently displayed on the display device 1550.

A hub interface 1518 may allow the GMCH 1508 and an input/output control hub (ICH) 1520 to communicate. The ICH 1520 may provide an interface to I/O devices that communicate with the computing system 1500. The ICH 1520 may communicate with a bus 1522 through a peripheral bridge (or controller) 1524, such as a peripheral component interconnect (PCI) bridge, a universal serial bus (USB) controller, or other types of peripheral bridges or controllers. The bridge 1524 may provide a data path between the processor 1502 and peripheral devices. Other types of topologies may be utilized. Also, multiple buses may communicate with the ICH 1520, e.g., through multiple bridges or controllers. Moreover, other peripherals in communication with the ICH 1520 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 1522 may communicate with an audio device 1526, one or more disk drive(s) 1528, and one or more network interface device(s) 1530 (which is in communication with the computer network 1503). Other devices may communicate via the bus 1522. Also, various components (such as the network interface device 1530) may communicate with the GMCH 1508 in some embodiments. In addition, the processor 1502 and the GMCH 1508 may be combined to form a single chip. Furthermore, the graphics accelerator may be included within the GMCH 1508 in other embodiments.

Furthermore, the computing system 1500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 1528), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 1500 may be arranged in a point-to-point (PtP) configuration. For example, processors, memory, and/or input/output devices may be interconnected by a number of point-to-point interfaces.

Figure 16:
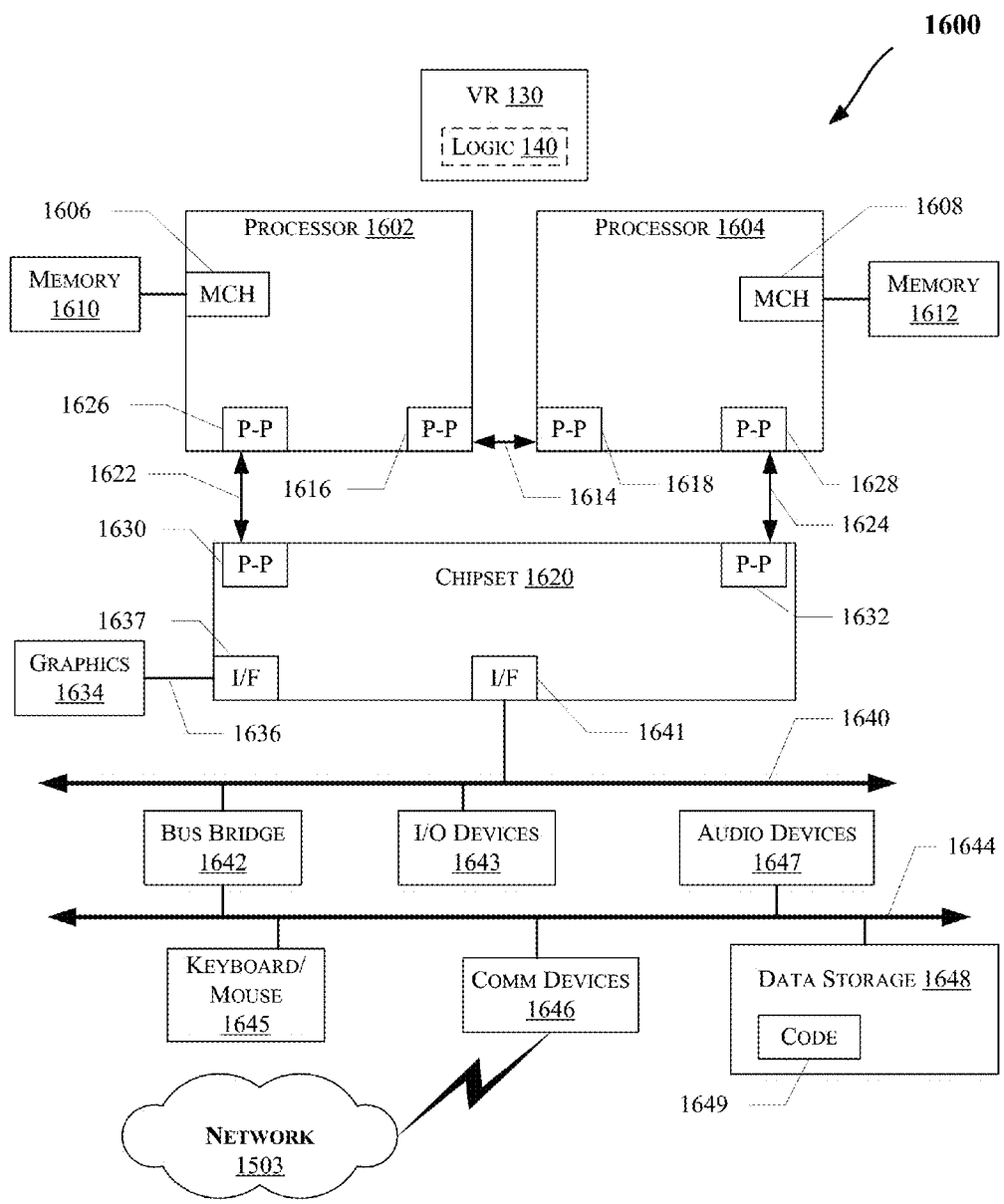

FIG. 16 illustrates a computing system 1600 that is arranged in a point-to-point (PtP) configuration, according to an embodiment. In particular, FIG. 16 shows a system where processors, memory, and input/output devices are interconnected by a number of point-to-point interfaces. The operations discussed with reference to FIGS. 1-15 may be performed by one or more components of the system 1600.

For example, a voltage regulator (such as VR 130 of FIG. 1) may regulate voltage supplied to one or more components of FIG. 16.

As illustrated in FIG. 16, the system 1600 may include several processors, of which only two, processors 1602 and 1604 are shown for clarity. The processors 1602 and 1604 may each include a local memory controller hub (MCH) 1606 and 1608 to enable communication with memories 1610 and 1612. The memories 1610 and/or 1612 may store various data such as those discussed with reference to the memory 1512 of FIG. 15. Also, the processors 1602 and 1604 may include one or more of the cores 106, logic 140, and/or sensor(s) 150 of FIG. 1.

In an embodiment, the processors 1602 and 1604 may be one of the processors 1502 discussed with reference to FIG. 15. The processors 1602 and 1604 may exchange data via a point-to-point (PtP) interface 1614 using PtP interface circuits 1616 and 1618, respectively. Also, the processors 1602 and 1604 may each exchange data with a chipset 1620 via individual PtP interfaces 1622 and 1624 using point-to-point interface circuits 1626, 1628, 1630, and 1632. The chipset 1620 may further exchange data with a high-performance graphics circuit 1634 via a high-performance graphics interface 1636, e.g., using a PtP interface circuit 1637.

In at least one embodiment, one or more operations discussed with reference to FIGS. 1-15 may be performed by the processors 1602 or 1604 and/or other components of the system 1600 such as those communicating via a bus 1640. Other embodiments, however, may exist in other circuits, logic units, or devices within the system 1600 of FIG. 16. Furthermore, some embodiments may be distributed throughout several circuits, logic units, or devices illustrated in FIG. 16.

Chipset 1620 may communicate with the bus 1640 using a PtP interface circuit 1641. The bus 1640 may have one or more devices that communicate with it, such as a bus bridge 1642 and I/O devices 1643. Via a bus 1644, the bus bridge 1642 may communicate with other devices such as a keyboard/mouse 1645, communication devices 1646 (such as modems, network interface devices, or other communication devices that may communicate with the computer network 1503), audio I/O device, and/or a data storage device 1648. The data storage device 1648 may store code 1649 that may be executed by the processors 1602 and/or 1604.

Figure 17:
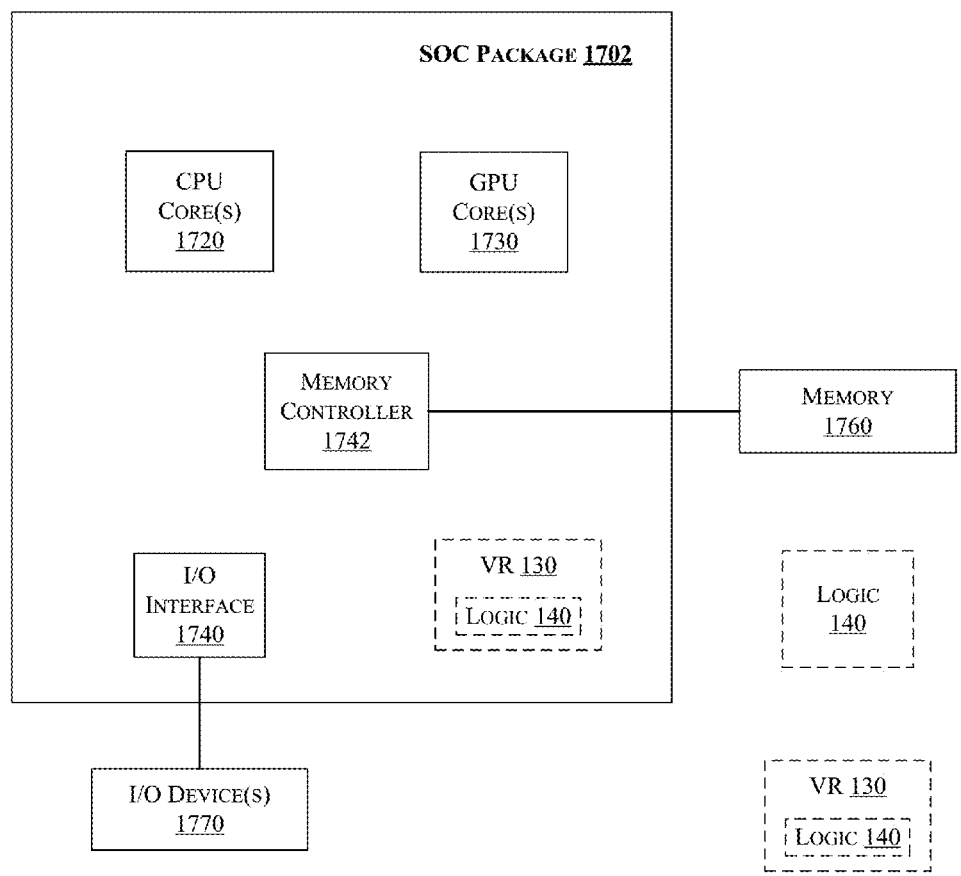

In some embodiments, one or more of the components discussed herein can be embodied as a System On Chip (SOC) device. FIG. 17 illustrates a block diagram of an SOC package in accordance with an embodiment. As illustrated in FIG. 17, SOC 1702 includes one or more Central Processing Unit (CPU) cores 1720, one or more Graphics Processor Unit (GPU) cores 1730, an Input/Output (I/O) interface 1740, and a memory controller 1742. Various components of the SOC package 1702 may be coupled to an interconnect or bus such as discussed herein with reference to the other figures. Also, the SOC package 1702 may include more or less components, such as those discussed herein with reference to the other figures. Further, each component of the SOC package 1720 may include one or more other components, e.g., as discussed with reference to the other figures herein. In one embodiment, SOC package 1702 (and its components) is provided on one or more Integrated Circuit (IC) die, e.g., which are packaged into a single semiconductor device.

As illustrated in FIG. 17, SOC package 1702 is coupled to a memory 1760 (which may be similar to or the same as memory discussed herein with reference to the other figures)

via the memory controller 1742. In an embodiment, the memory 1760 (or a portion of it) can be integrated on the SOC package 1702.

The I/O interface 1740 may be coupled to one or more I/O devices 1770, e.g., via an interconnect and/or bus such as discussed herein with reference to other figures. I/O device(s) 1770 may include one or more of a keyboard, a mouse, a touchpad, a display, an image/video capture device (such as a camera or camcorder/video recorder), a touch screen, a speaker, or the like. Furthermore, SOC package 1702 may include/integrate the logic 140 and/or VR 130 in an embodiment. Alternatively, the logic 140 and/or VR 130 may be provided outside of the SOC package 1702 (i.e., as a discrete logic).

The following examples pertain to further embodiments. Example 1 includes an apparatus comprising: voltage regulator logic having a first phase portion and a second phase portion; and the voltage regulator logic to include a single capacitor coupled between switches of the first phase portion and the second phase portion. Example 2 includes the apparatus of example 1, wherein each of the first phase portion and the second phase portion is to comprise a plurality of switches. Example 3 includes the apparatus of example 1, wherein the switches of the first phase portion is to comprise a first switch, and a second switch, wherein a first end of the single capacitor is to be coupled between the first switch and the second switch of the first phase portion. Example 4 includes the apparatus of example 3, wherein the switches of the second phase portion is to comprise a third switch and a fourth switch, wherein a second end of the single capacitor is to be coupled between the third switch and the fourth switch of the second phase portion. Example 5 includes the apparatus of example 1, wherein the voltage regulator logic is to comprise a phase shifted filter network to reduce an output ripple. Example 6 includes the apparatus of example 5, wherein the phase shifted filter network is to comprise: an output capacitor, a first inductor, and a second inductor, wherein the first inductor is to be coupled to a first end of the single capacitor through a first switch of the first phase portion, wherein the second inductor is to be coupled to a second end of the single capacitor through a second switch of the second phase portion. Example 7 includes the apparatus of example 1, wherein the voltage regulator logic is a selectable-mode Voltage Regulator (VR) to implement one or more of a plurality of VR modes. Example 8 includes the apparatus of example 7, wherein the plurality of voltage regulator logic modes is to comprise at least one of: a three-level buck voltage regulator, a traditional buck voltage regulator, and a combination of the three-level buck VR and the traditional buck VR. Example 9 includes the apparatus of example 1, wherein at least one of the switches is to receive a control input from a controller logic. Example 10 includes the apparatus of example 9, wherein the controller logic comprises mode selection logic to select a VR mode. Example 11 includes the apparatus of example 1, wherein at least one of the switches is selected from the group comprising: field effect transistors (FETs), bipolar junction transistors (BJTs), insulated gate bipolar transistors (IGBTs), and relays. Example 12 includes the apparatus of example 1, wherein one or more of: the logic, a processor, and memory are on a single integrated circuit.

Example 13 includes a computing system comprising: memory to store data; a processor, coupled to the memory, to perform one or more operations on the stored data; and a selectable-mode voltage regulator (VR) to implement one or more of a plurality of VR modes, the selectable-mode VR comprising: a plurality of switches, a first inductor and a second inductor, a single fly capacitor, an output capacitor; and controller logic to manage operations of the selectable-mode VR, wherein the single fly capacitor is to be coupled between a first phase portion and a second phase portion of the selectable-mode voltage regulator. Example 14 includes the system of example 13, wherein each of the first phase portion and the second phase portion is to comprise two or more switches from the plurality of switches. Example 15 includes the system of example 14, wherein the two or more switches of the first phase portion is to comprise a first switch, and a second switch, wherein a first end of the single fly capacitor is to be coupled between the first switch and the second switch of the first phase portion. Example 16 includes the system of example 15, wherein the two or more switches of the second phase portion is to comprise a third switch and a fourth switch, wherein a second end of the single fly capacitor is to be coupled between the third switch and the fourth switch of the second phase portion. Example 17 includes the system of example 13, wherein the voltage regulator is to comprise a phase shifted filter network to reduce an output ripple. Example 18 includes the system of example 17, wherein the phase shifted filter network is to comprise: the output capacitor, the first inductor, and the second inductor, wherein the first inductor is to be coupled to a first end of the single fly capacitor through a first switch of the first phase portion, wherein the second inductor is to be coupled to a second end of the single fly capacitor through a second switch of the second phase portion. Example 19 includes the system of example 13, wherein the plurality of voltage regulator logic modes is to comprise at least one of: a three-level buck voltage regulator, a traditional buck voltage regulator, and a combination of the three-level buck VR and the traditional buck VR. Example 20 includes the system of example 13, wherein at least one of the plurality of switches is to receive a control input from a controller logic. Example 21 includes the system of example 20, wherein the controller logic comprises mode selection logic to select a VR mode. Example 22 includes the system of example 13, wherein at least one of the plurality of switches is selected from the group comprising: field effect transistors (FETs), bipolar junction transistors (BJTs), insulated gate bipolar transistors (IGBTs), and relays. Example 23 includes the system of example 13, wherein the VR, the processor, and the memory are on a single integrated circuit.

Example 24 includes a computing system comprising: memory to store data; a processor, coupled to the memory, to perform one or more operations on the stored data; voltage regulator logic having a first phase portion and a second phase portion; and the voltage regulator logic to include a single capacitor coupled between switches of the first phase portion and the second phase portion. Example 25 includes the system of example 24, wherein each of the first phase portion and the second phase portion is to comprise a plurality of switches. Example 26 includes the system of example 24, wherein the switches of the first phase portion is to comprise a first switch, and a second switch, wherein a first end of the single capacitor is to be coupled between the first switch and the second switch of the first phase portion. Example 27 includes the system of example 26, wherein the switches of the second phase portion is to comprise a third switch and a fourth switch, wherein a second end of the single capacitor is to be coupled between the third switch and the fourth switch of the second phase portion.

In various embodiments, the operations discussed herein, e.g., with reference to FIGS. 1-17, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-17.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
voltage regulator logic having a first phase portion and a second phase portion; and
the voltage regulator logic to include a single capacitor coupled between switches of the first phase portion and the second phase portion, wherein the voltage regulator logic is a selectable-mode Voltage Regulator (VR) to implement one or more of a plurality of VR modes, wherein the plurality of voltage regulator logic modes is to comprise at least one of: a three-level buck voltage regulator, a traditional buck voltage regulator, and a combination of the three-level buck VR and the traditional buck VR.

2. The apparatus of claim 1, wherein each of the first phase portion and the second phase portion is to comprise a plurality of switches.

3. The apparatus of claim 1, wherein the switches of the first phase portion is to comprise a first switch, and a second switch, wherein a first end of the single capacitor is to be coupled between the first switch and the second switch of the first phase portion.

4. The apparatus of claim 3, wherein the switches of the second phase portion is to comprise a third switch and a fourth switch, wherein a second end of the single capacitor is to be coupled between the third switch and the fourth switch of the second phase portion.

5. The apparatus of claim 1, wherein the voltage regulator logic is to comprise a phase shifted filter network to reduce an output ripple.

6. The apparatus of claim 5, wherein the phase shifted filter network is to comprise: an output capacitor, a first inductor, and a second inductor, wherein the first inductor is to be coupled to a first end of the single capacitor through a first switch of the first phase portion, wherein the second inductor is to be coupled to a second end of the single capacitor through a second switch of the second phase portion.

7. The apparatus of claim 1, wherein at least one of the switches is to receive a control input from a controller logic.

8. The apparatus of claim 7, wherein the controller logic comprises mode selection logic to select a VR mode.

9. The apparatus of claim 1, wherein at least one of the switches is selected from the group comprising: field effect transistors (FETs), bipolar junction transistors (BJTs), insulated gate bipolar transistors (IGBTs), and relays.

10. The apparatus of claim 1, wherein one or more of: the logic, a processor, and memory are on a single integrated circuit.

11. A computing system comprising:
memory to store data;
a processor, coupled to the memory, to perform one or more operations on the stored data; and
a selectable-mode voltage regulator (VR) to implement one or more of a plurality of VR modes, the selectable-mode VR comprising: a plurality of switches, a first inductor and a second inductor, a single fly capacitor, an output capacitor; and controller logic to manage operations of the selectable-mode VR,
wherein the single fly capacitor is to be coupled between a first phase portion and a second phase portion of the selectable-mode voltage regulator, wherein the plurality of voltage regulator logic modes is to comprise at least one of: a three-level buck voltage regulator, a traditional buck voltage regulator, and a combination of the three-level buck VR and the traditional buck VR.

12. The system of claim 11, wherein each of the first phase portion and the second phase portion is to comprise two or more switches from the plurality of switches.

13. The system of claim 12, wherein the two or more switches of the first phase portion is to comprise a first switch, and a second switch, wherein a first end of the single fly capacitor is to be coupled between the first switch and the second switch of the first phase portion.

14. The system of claim 13, wherein the two or more switches of the second phase portion is to comprise a third switch and a fourth switch, wherein a second end of the single fly capacitor is to be coupled between the third switch and the fourth switch of the second phase portion.

15. The system of claim 11, wherein the voltage regulator is to comprise a phase shifted filter network to reduce an output ripple.

16. The system of claim 15, wherein the phase shifted filter network is to comprise: the output capacitor, the first inductor, and the second inductor, wherein the first inductor is to be coupled to a first end of the single fly capacitor through a first switch of the first phase portion, wherein the second inductor is to be coupled to a second end of the single fly capacitor through a second switch of the second phase portion.

17. The system of claim 11, wherein at least one of the plurality of switches is to receive a control input from a controller logic.

18. The system of claim 17, wherein the controller logic comprises mode selection logic to select a VR mode.

19. The system of claim 11, wherein at least one of the plurality of switches is selected from the group comprising:

field effect transistors (FETs), bipolar junction transistors (BJTs), insulated gate bipolar transistors (IGBTs), and relays.

20. The system of claim 11, wherein the VR, the processor, and the memory are on a single integrated circuit.

* * * * *